F. L. JOHNSON.
COLLAPSIBLE TIRE CORE.
APPLICATION FILED JAN. 31, 1920.

1,352,274.

Patented Sept. 7, 1920.

INVENTOR.
Frank L. Johnson
BY
ATTORNEYS.

UNITED STATES PATENT OFFICE.

FRANK L. JOHNSON, OF AKRON, OHIO.

COLLAPSIBLE TIRE-CORE.

1,352,274.　　　　　Specification of Letters Patent.　　Patented Sept. 7, 1920.

Application filed January 31, 1920.　Serial No. 355,349.

*To all whom it may concern:*

Be it known that I, FRANK L. JOHNSON, a citizen of the United States, residing at Akron, in the county of Summit and State of Ohio, have invented certain new and useful Improvements in Collapsible Tire-Cores; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

This invention relates to improvements in collapsible tire cores for manufacturing outer shoes of double tube pneumatic tires, and the object thereof is to provide a collapsible core which may be quickly assembled or collapsed, and which when assembled will present the same circle which was formed during the machining of the core.

As is well known, tire cores of necessity, must be composed of a plurality of segments, which are disassembled during the operation of backing the core out of the manufactured casing; said segments being assembled prior to the building up of a shoe therefrom, and when united will form an annular core body; the invention more particularly residing in the means whereby the various segments constituting the body portion of the core are temporarily united.

These and other features of my invention are hereinafter more fully described and pointed out, and are illustrated in the accompanying drawings, in which.

Figure 1:
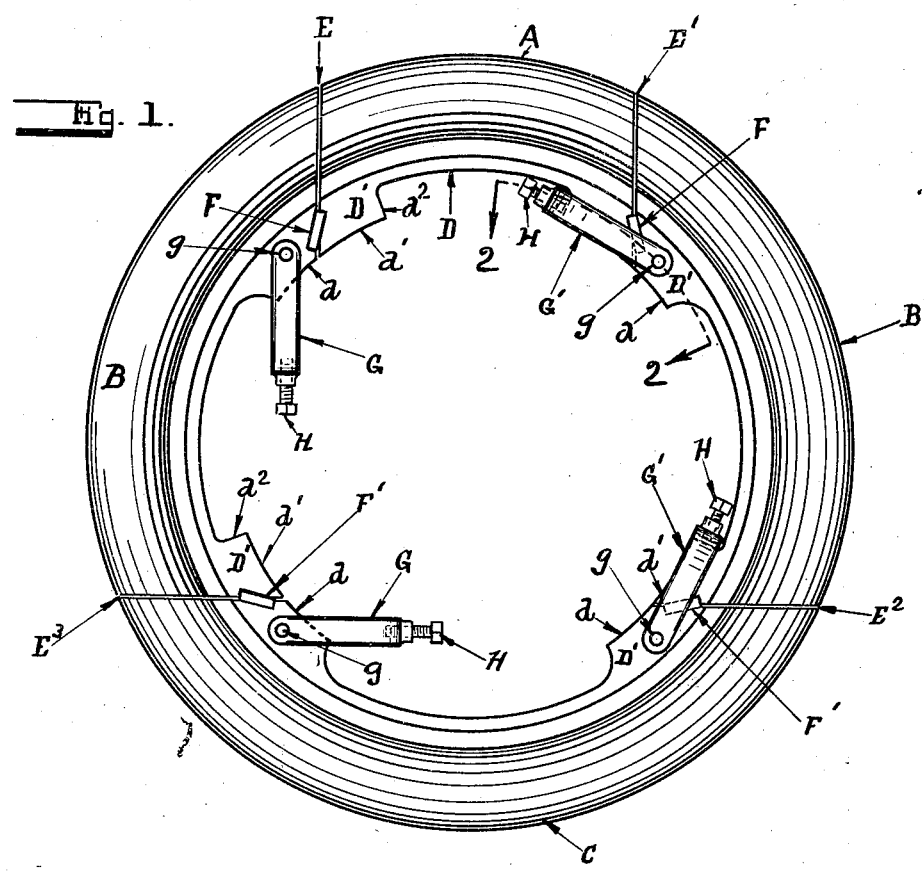
Figure 1, is a side view in elevation, of a tire core having my invention installed thereon.
Figure 2:
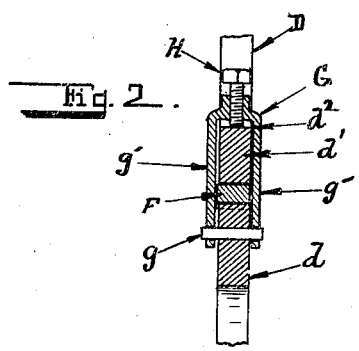
Fig. 2, is a segmental section on the line 2—2 in Fig. 1, through one of the fastening devices.

In these drawings A, B, B' and C indicate segmental sections of a tire core, which during the process of its manufacture is preferably formed in a complete annulus having an interior radial flange D which is provided with inwardly projecting lugs D'. After the annulus or circular core has been machined to the proper form it is preferably sawed at the points E, E', $E^2$ and $E^3$, the saw dividing the lugs D' into portions $d$, $d'$; the portions $d'$ being provided with the square end $d^2$.

In the ends of the sections A, B, B' and C within the radial lugs D', keys F, F and F' F' are placed; said keys F F and F' F' being set into the metal of the lugs D' so that one-half of the key is embedded in the portion $d$, and one-half in the portion $d'$ of the lugs D'. While I prefer to position the keys F and F' angularly in said lugs D' it is obvious that they may if desired, be otherwise placed, or that cylindrical keys may be used instead of rectangular keys, as shown in the drawing. In practice I prefer to secure the keys F' F' permanently in the portion $d$ of the radial lug on the segment C, thereby reducing the detached parts of the core; the keys F, however, are inserted after the segments of the core are placed in assembled position, as shown in Fig. 1.

Pivoted to the portions $d$ of the lugs D' are clevises G G and G' G'; the clevises G' being in the position thereof, when the segments A, B, B' and C are secured together, ready to have a tire built therethrough, and the clevises G and G' are secured on the lugs D' by means of pivots $g$ which are so positioned radially that the shoulders $d^2$ on the lugs D' will be at substantially right angles to the pivots $g$. H indicates set screws in the clevises G G', which, when the core is assembled, are screwed inwardly against the shoulders $d^2$, and act to clamp the ends of the segments A, B, B' and C firmly against the keys F and F'; said keys being of sufficient dimension to maintain spaces between the core sections equal to the thickness of the saw used in sawing said segments, so that the circumference of the core when assembled, will be the same as the machine circumference of the core before it was cut into segments.

The keys F F are held in place by means of clevises after the same are moved to the positions shown by the clevises G' and the screws H tightened against the shoulders $d^2$, as the lugs $g'$ of the clevises overlap the ends of the keys, thereby preventing them from falling downward, should the pressure of the screws H not be sufficient to hold the keys in place.

After a tire casing has been constructed over the core and vulcanized thereon, the screws H are turned backward and the clevises are swung substantially to the position of the clevises G G in Fig. 1, the keys F F are then removed and the segment A is withdrawn inwardly toward the center of the core, and removed from the interior of the finished tire. The segments B and B' are then also withdrawn from the interior of the finished tire, and lastly the segments C are removed. The core is then reassembled as hereinbefore described.

Having thus fully shown and described my invention so as to enable others to utilize the same, what I claim as new and desire to secure by Letters Patent is:—

1. In a collapsible tire-core, the combination of a plurality of segments, keys sunk into the adjoining ends of said segments, clevises pivoted on said sections and extending across the adjoining ends of said segments, and set-screws in said clevises adapted to engage the next adjacent segment and clamp the adjoining ends together, substantially as set forth.

2. In a collapsible tire-core, a plurality of lugs on the inner periphery thereof, said tire-core being divided into segments on transverse lines through said lugs, keys embedded in the adjoining ends of said segments, and clamp members adapted to engage the two portions of each of said lugs and clamp the adjoining ends of said segments securely against said keys, substantially as described.

In testimony whereof I affix my signature.

FRANK L. JOHNSON.